Patented Mar. 22, 1938

2,111,951

UNITED STATES PATENT OFFICE 2,111,951

HYDRO-METALLURGY

Alfred M. Thomsen, San Francisco, Calif.

No Drawing. Application May 7, 1934,
Serial No. 724,449

2 Claims. (Cl. 75—97)

For the purpose of classification, modern hydro-metallurgy may be divided into two main divisions: 1, the acid group, where the solvent for the metals has an acid reaction; and, 2, the alkaline group, where the solvent has an alkaline reaction. To the latter division belong the copper-ammonia process and the various modifications of cyanide; to the former the many variations of electrolytic zinc and copper extraction processes for complex ores, clorination, chloridizing roasting (Longmaid-Henderson), and the use of acid salts, and sulphur dioxide.

The improvements about to be described reside, with one exception, entirely within the first of these divisions,—the acid group, and are concerned more particularly with the separation of the dissolved metals from one another, and with their separation from solution in their respective solvents, than with the means whereby they are put into solution. In the electrolytic processes the precipitant is the current, and in general the acid solvent is regenerated simultaneously. In the remainder of the other chemical processes above mentioned the precipitant is in general some sulphide, or metallic iron; but in either case any dissolved zinc or any contained soda salts are usually lost, being too impure to recover.

In order to improve this state of affairs, I make use of a series of inter-related steps that together constitute a process. These steps are evaporation; calcination; and precipitation with either metallic oxides, metallic hydroxides, lime, or magnesia. Some of these steps are of necessity alternates for certain other steps, but their underlying functions are so similar that they are best described as an entity. (Note.) The term "magnesia", as used by me herein, means either carbonate, oxide, or hydroxide of magnesium.

To illustrate: In the Longmaid-Henderson process pyrite cinders are roasted with salt and leached. The residue goes to the iron smelter as "purple ore", the solution is then run over scrap iron, and then to waste. The cement copper, containing gold and silver, is then smelted, but all the soda salts, iron salts, and zinc salts are wasted. In lieu of this I proceed as follows:

To the solution from the leaching tanks I add, first, enough magnesia as hydrate, or oxide, or carbonate, to precipitate the iron, oxidizing, if necessary, any ferrous salts so as to insure complete elimination of iron. In addition, any arsenic and antimony will also be precipitated, and, of course, all free acid will have been neutralized. After separating the precipitate, a further addition of magnesia, as either oxide or hydrate, will precipitate the copper in preference to the zinc, and, after removing this precipitate, full precipitation of the zinc can be performed by the addition of the necessary quantity of magnesia. Proceeding in this manenr, separation has been effected between the iron, copper, and zinc constituents of the ore, and the entire sulphur content of the solution (as sulphate) has been conserved. The end solution from the zinc precipitation manifestly, then, contains the sulphates and chlorides of soda and magnesia. From this mixture no difficulty is encountered in obtaining at will the sulphate as either Epsom salts or sodium sulphate, and obtaining the chloride as salt or as magnesium chloride. In passing I desire to make clear the point that magnesia in the form of milk of magnesia, derived by the interaction of lime and sea-water, is far more efficacious than in any other form.

Under certain conditions the above procedure might be modified by precipitating the copper as sulphide, say by $H_2S$, neutralizing the resultant acidity by means of magnesia, and then proceeding as before. This diversion would be indicated by an ore high in silver, but, in addition, it should be noted that while the copper-zinc separation is not absolutely perfect, the intermediate use of $H_2S$ results in a perfect removal of all gold, silver, and copper, from the solution.

The use of magnesia as a precipitant solves the difficulty, which otherwise demands that of economic necessity all the soda and zinc salts must be wasted, and, in addition, much metallic iron. If lime be used in place of magnesia, every precipitate will be diluted with an immense quantity of calcium sulphate, and its further treatment rendered all but impossible. In addition, the end solution will consist of nothing but a weak solution of common salt and therefore worthless. The substitution of magnesia for lime thus serves two purposes; it gives clean precipitates, and it conserves the soluble sulphates in the end solution.

In spite of the definite statement concerning the unsuitability of lime, there is yet a function which can be performed by it. This will be described at a later period. So far, the illustration has concerned itself with the leach liquors of the Longmaid-Henderson process, but it will be evident that whatever be the origin of the solution the same remarks will apply, provided said solution possesses similar characteristics to the one above mentioned, to-wit: whenever said solution consists of a mixture of sulphates and/or chlorides of various metals.

A slightly different version is presented when the acid solvent is sulphur dioxide. In this case the metals will be present in solution as soluble bi-sulphites, as practically all the heavy metals possess almost insoluble sulphites. At the point of neutralization, therefore, the metallic content will be almost totally precipitated as a mixture of normal sulphites. The one outstanding exception to this rule is furnished by manganese. In this case, particularly if the manganese be present as the dioxide, the metal will be found in solution as sulphate and/or di-thionate, which are stable compounds that are not precipitated upon neutralization. This peculiarity may thus be made use of in the separation of the last named metal.

As an illustration, let us assume either a naturally oxidized or a roasted ore containing iron, copper, manganese and zinc, together with the precious metals. If such ore be treated with an excess of sulphur di-oxide, the insoluble residue will contain most of the iron and all the precious metal content. Some iron will go into solution, and nearly all the copper, zinc, and manganese will do likewise. We now add some alkali, say soda ash, to this solution until neutral, and thus obtain a precipitate of the mixed sulphites. This is separated from the bulk of the solution by appropriate means and passed through a roasting furnace,—being thus converted into oxides. A supply of such oxides having thus been obtained no more soda will be needed. In place of soda we add this batch of mixed oxides to a new batch of solution. The effect will be to precipitate the metallic content as sulphite about as efficiently as in the case of the soda ash reaction, the added oxides being, of course, converted into sulphites. We shall thus obtain from the ore a product consisting of iron, copper, and zinc as sulphites, and a solution of manganese from which this metal may subsequently be removed. A part of the sulphite product is roasted and returned for use as a precipitant, the balance is separated into its constituent parts by any appropriate means.

By cautious roasting the sulphite precipitate may be converted first into sulphates, and then into oxides, and as these sulphates break up at widely separate temperatures we may use this plan to effectively separate the metals from one another. If this roasting be performed at the lowest possible temperature, and if the calcines be then leached, most of the iron is left behind as an insoluble residue, and the solution will contain little but the sulphates of copper and zinc. Further separation is then effected according to the scheme already given in the first illustration. The final end solution will be, to all intents and purposes, a solution of Epsom salts.

The manganese solution remaining after the separation of the other metals is now either evaporated for manganese salts, or precipitated with any hydroxide of greater solubility than that of manganese. Magnesia is very desirable, but lime may be used in the event that it be used in the form of lime water, not as milk of lime. This is, of course, impossible except in a place where a large supply of very cheap water is available. By pursuing this plan it would likewise be possible to use lime in place of magnesia elsewhere in the illustrations above given, and thus secure precipitates of acceptable purity, but if magnesia were available it is much to be preferred as the lime, of course, will entail the entire loss of the end solution through prohibitive dilution.

In the event that the manganese solution is to be evaporated, instead of precipitated, it will be possible to return it cyclically several times to fresh ore, and thus build up its manganese content before it is by-passed to the evaporator. Or, in places where climatic conditions will permit, the use of solar or atmospheric evaporation may well be used until the solution is sufficiently concentrated to permit the use of fuel. The resultant product of the evaporation to dryness will not be even "crude" manganese sulphate, but, rather, a mixture of complex thionates. However, if it be cautiously heated to a little below redness, and subsequently leached, it will produce a very pure manganese sulphate solution from which very pure crystals can be obtained.

The residue from the sulphur dioxide treatment will, as already indicated, contain all of the precious metals present in the ore, and will be in such condition that they are readily amenable to extraction with cyanide. It will, of course, be a prime essential that the ore be thoroughly washed before treating with cyanide, but in addition the protective alkali must be kept very high. It is generally advisable to add some soda ash or caustic soda in addition to the lime, and this will also aid in the percentage of extraction and diminish the time factor. The expense of such high alkalinity can be minimized by discarding but infrequently through a zinc box for final precipitation, meanwhile circulating the cyanide solution through electrolytic cells for the extraction of a part of the value before it be returned to fresh ore. In this manner it will become empoverished in silver and gold but never "barren", until it is discarded entirely. The zinc consumption will thus become much less.

It will be self-evident that these remarks on cyaniding the insoluble residue from sulphur dioxide treatment apply with equal force to the "purple ore" of the first illustration. Economically, this would not often be the case as such heavy sulphides are rarely rich in gold or silver, and, besides, the precious metals are so well extracted by the chloridizing treatment. However, in the case of residues resulting from the straight sulphate roast and leach it would be very acceptable.

There might also be special conditions in remote or arid districts where an excellent plan for any such solution as any one of those herein described would be to evaporate it to dryness, calcine for the mixed oxides, and send either the mixed salts, or the calcines from such salts, to more favored points for subsequent treatment. This would in fact constitute a kind of "chemical concentration", whereby the gangue and most of the iron could be left at the mine while a concentrated product of metals, either as oxides, or salts, could be sent away. Where solar evaporation could be used, such a plan would have many advantages.

Likewise, in my first illustration, it would be quite proper, if local conditions should warrant, to proceed as follows:

Let the solution be evaporated to dryness, the residual salts partially calcined, and then leached with water. Depending upon the time and temperature of such calcination, which, of course, will be dictated by the requirements of the material undergoing treatment, it is but simple practice to separate iron from the more valuable metals, as well as to separate copper from lime.

The expression "heavy metals", as used herein, is to be taken in the sense employed by I. W. D. Hackh's "A Chemical Dictionary", "any metal whose specific gravity is greater than four."

I claim:

1. The herein described process of extracting the copper-zinc-silver contents of an ore which comprises: chloridizing-roasting and leaching of the ore in the Longmaid-Henderson manner; neutralizing the resultant solution by adding thereto a basic compound of magnesium; separating the precipitate produced thereby; selectively precipitating the residual silver, copper and zinc resident in the resultant solution by successive additions of suitable quantities of magnesium hydrate and removing each precipitate as formed before the next addition of the precipitant until it will no longer give a precipitate with magnesium hydrate; and finally evaporating the resultant solution in order to recover the sulphates and chlorides of magnesium and sodium still resident therein.

2. The herein described process of extracting the copper-silver-zinc-cobalt-nickel-manganese contents of an ore which comprises: chloridizing-roasting and leaching of the ore in the Longmaid-Henderson manner; neutralizing the resultant solution by adding thereto a basic compound of magnesium; separating the precipitate produced thereby; removing the hydrogen sulphide group of metals by adding hydrogen sulphide and separating the precipitate thus produced; precipitating all cobalt, nickel, manganese and zinc resident in the resultant solution by the addition of enough magnesium hydrate until the solution no longer yields a precipitate with said reagent; separating said precipitate; and finally evaporating the resultant solution to recover the sulphates and chlorides of magnesium and sodium still resident therein.

ALFRED M. THOMSEN.